(12) United States Patent
Mizuno et al.

(10) Patent No.: US 7,029,790 B2
(45) Date of Patent: Apr. 18, 2006

(54) CLOSED TYPE BATTERY

(75) Inventors: Hiroyuki Mizuno, Utsunomiya (JP); Hiroshi Hanafusa, Utsunomiya (JP); Tetsuhiro Ogaku, Utsunomiya (JP); Kikuo Hirano, Utsunomiya (JP); Jotaro Horiuchi, Utsunomiya (JP)

(73) Assignee: Neo Tokin Tochigi, Ltd., Utsunomiya (JP)

( * ) Notice: Subject to any disclaimer, the term of this patent is extended or adjusted under 35 U.S.C. 154(b) by 338 days.

(21) Appl. No.: 10/308,035

(22) Filed: Dec. 3, 2002

(65) Prior Publication Data
US 2003/0104276 A1  Jun. 5, 2003

(30) Foreign Application Priority Data
Dec. 4, 2001  (JP) .............................. 2001-370325

(51) Int. Cl.
*H01M 2/06* (2006.01)
*H01M 2/26* (2006.01)

(52) U.S. Cl. ................. 429/161; 429/180; 429/181

(58) Field of Classification Search ............... 429/161, 429/180, 181, 182, 183, 184
See application file for complete search history.

(56) References Cited

U.S. PATENT DOCUMENTS 6,835,494 B1 * 12/2004 Hayashi et al. ............. 429/180

2002/0009634 A1 * 1/2002 Oogaku ....................... 429/180
2002/0039678 A1 * 4/2002 Higa ........................... 429/183

FOREIGN PATENT DOCUMENTS

| EP | 0 319 128 | 6/1989 |
| EP | 1 089 363 A1 | 4/2001 |
| GB | 2111295 | * 6/1983 |
| JP | 07245093 | 9/1995 |

OTHER PUBLICATIONS

Internet Page: dict.aiedu.com/word/recess (AI EDU An Internet Dictionary).*

* cited by examiner

*Primary Examiner*—Stephen J. Kalafut
(74) *Attorney, Agent, or Firm*—Westerman, Hattori, Daniels & Adrian, LLP

(57) ABSTRACT

The invention provides a closed type battery comprising an electrode-leading terminal formed by caulking that ensures satisfactory sealing sealability. That terminal comprising a metal plate for sealing up an opening in a battery can, an insulating member that cover a through-hole provided through the metal plate and both surfaces of the metal plate around the through-hole, an electrode-drawing sheet positioned on a surface of the insulating member located on an outer surface of a battery and an electrode-leading pin that is inserted into the through-hole in the electrode-drawing sheet and caulked from above and below. At the surface of contact of a flange of the electrode-leading pin with the insulating member there is provided at least a projection.

6 Claims, 6 Drawing Sheets

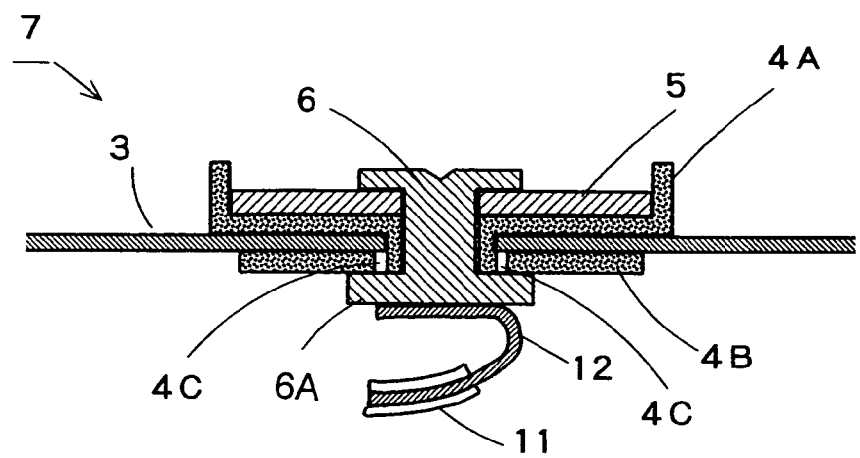
Fig. 5 (A) (PRIOR ART)
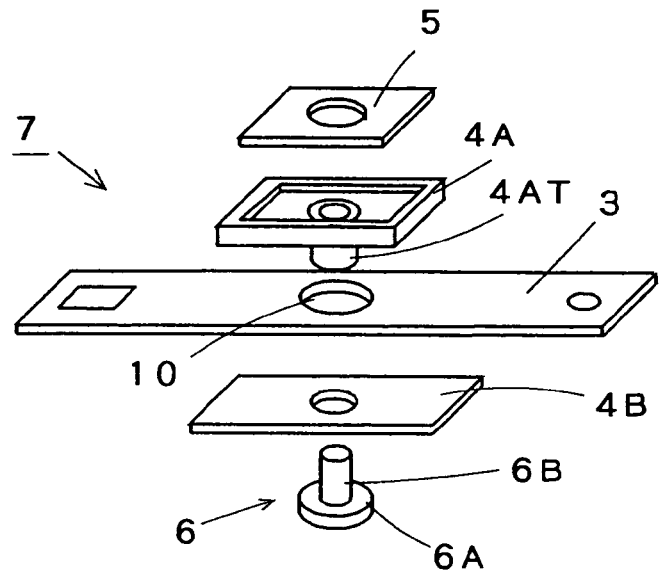
Fig. 5 (B) (PRIOR ART)

CLOSED TYPE BATTERY

BACKGROUND OF THE INVENTION

The present invention relates generally to a closed type battery, and more particularly to a closed type battery comprising a battery can and a battery terminal different in polarity therefrom, which is mounted to the battery can by caulking via an insulating member.

Various batteries are used as power sources for electronic equipments of miniature size, and miniature yet large-capacity closed batteries are employed as power sources for cellular phones, notebook PCs, camcorders, etc. Typically, closed batteries using a non-aqueous electrolyte such as high-capacity lithium batteries and lithium ion rechargeable batteries are now used.

To keep pace with the downsizing of equipments, closed batteries of rectangular shape capable of making effective use of a small space, to say nothing of cylindrical batteries, are widely used. In a typical rectangular battery, a battery can that serves as one electrode of the battery is provided with an electrode terminal while isolated therefrom by an insulating member.

One such typical example of the closed type battery of rectangular shape is shown in FIG. 4.

A closed type battery shown generally at 1 comprises a cylindrical form of rectangular metal package 2 (hereinafter often called the battery can) made of stainless steel, soft steel nickeled on its surface, etc., in which there is a battery element comprising a roll form of cathode and anode stacked one upon another via a separator. At the upper end of the battery can 2, there is a header 7 formed by integrating an external insulating sheet 4A and a cathode-side electrode drawing sheet 5 with a metal sheet 3 by means of a cathode-side electrode leading pin 6; this header 7 is mounted and sealed at the opening of the battery can 2. One portion 8 of the header 7 is made thinner than the rest thereof so as to let an abnormally rising internal pressure escape from the battery and another portion of the header 7 is provided with a hole 9 from which an electrolyte is poured in the battery assembly and which is sealed up after the pouring of the electrolyte. After the electrolyte is poured from the hole 9 into the battery assembly, a metal member such as a stainless steel member is embedded in that hole, and then welded thereto for sealing purposes.

One exemplary header is shown in FIGS. 5(A) and 5(B). FIG. 5(A) is an exploded perspective view of the header, and FIG. 5(B) is illustrative of the header in which an electrode-leading pin is not caulked as yet.

An internal insulating sheet 4B formed of a polypropylene, fluorocarbon resin, etc. is mounted on a metal plate 3 formed of a stainless steel plate, a nickeled soft steel plate, etc. by inserting a projection on the sheet 4B into a through-hole 10 formed in the plate 3 from below. Then, an external insulating sheet 4A is placed over the upper surface of the plate 3 to form an insulating member. Then, an electrode-leading pin 6 formed of a metal of good conductivity such as aluminum or an aluminum alloy and having a collar 6A is inserted through a hollow portion of the projection on the internal insulating sheet 4B, and an electrode-drawing sheet 5 is fitted in the external insulating sheet 4A. Finally, the collar 6A and the tip of a shaft 6B of the electrode-leading pin are caulked from above and below to form a header 7.

After joined to the collar 6a of the electrode lead pin 6 of the thus prepared header 7, an electrically conductive tab 12 joined to the battery element and covered with an insulating member 11 is fitted into an opening at the battery can, and then laser welded at its periphery to seal up the opening.

Upon header assembling, the electrode-leading pin 6 is crushed by caulking into contact with the plane of the electrode-drawing sheet 5, so that a conductive connection is made between the electrode-leading pin and the cathode-drawing sheet 5. On the other hand, the lower surface of the electrode-drawing sheet 5 comes in engagement with the surface of the external insulating sheet 4A to keep air-tightness.

The external insulating sheet 4A, because of having a cylindrical portion 4AT, is kept stable even upon caulking. However, the internal insulating sheet 4B, because of being in a flat sheet form, is urged against the flange 6A of the electrode-leading pin upon caulking, producing force that acts outwardly from the center of the shaft. This in turn may give rise to a void 4C at the junction of the external insulating sheet 4A and the internal insulating sheet 4B, which void may otherwise make the sealing of the battery worse over time.

FIG. 6 is illustrative of another header. FIG. 6 is a sectional view of the header.

The header of FIG. 6 is different from that of FIGS. 5(A) and 5(B) in that an external insulating sheet 4B has a cylindrical portion 4BT.

As an electrode-leading pin 6 is crushed by caulking upon header assembly, a tip 6C of the electrode-leading pin is crushed to urge an electrode-drawing sheet 5, so that a monolithic structure is formed. When the tip 6C of the electrode-leading pin 6 is crushed, however, one end of the electrode-drawing sheet 5 is urged to flip up the other end. This may again result in a void 4D between the electrode-drawing sheet 5 and the external insulting sheet 4A, exercising adverse influences on the sealing properties of the battery as is the case of FIG. 4.

BRIEF DESCRIPTION OF THE DRAWINGS

FIGS. 5(A) and 5(B) are illustrative of one example of the header in the closed type battery.

SUMMARY OF THE INVENTION

Figure 1:
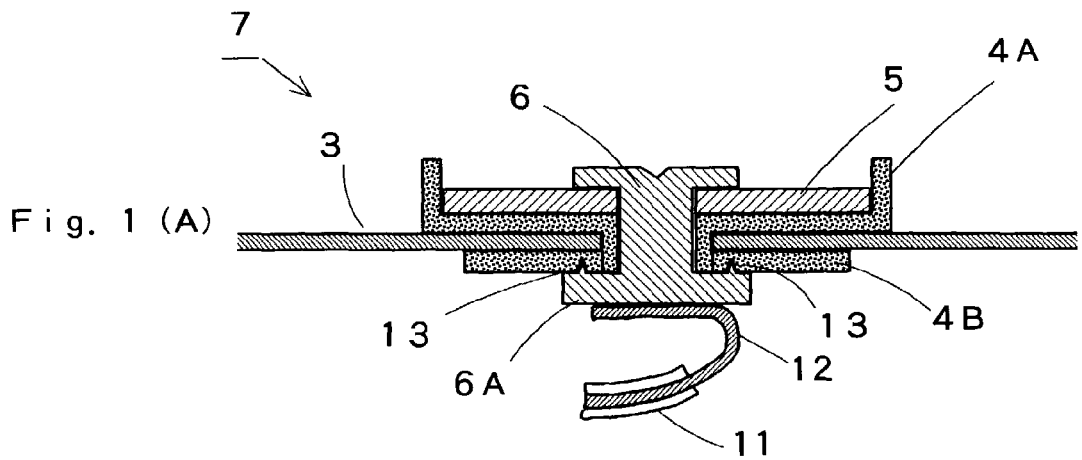
FIGS. 1(A), 1(B) and 1(C) are illustrative of one embodiment of the closed type battery according to the present invention.
Figure 1:
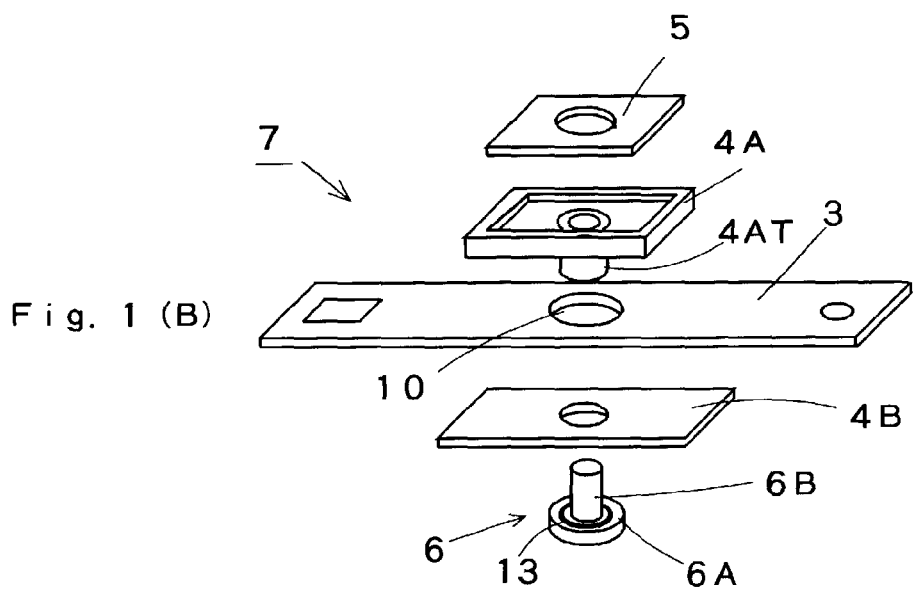
Figure 1:
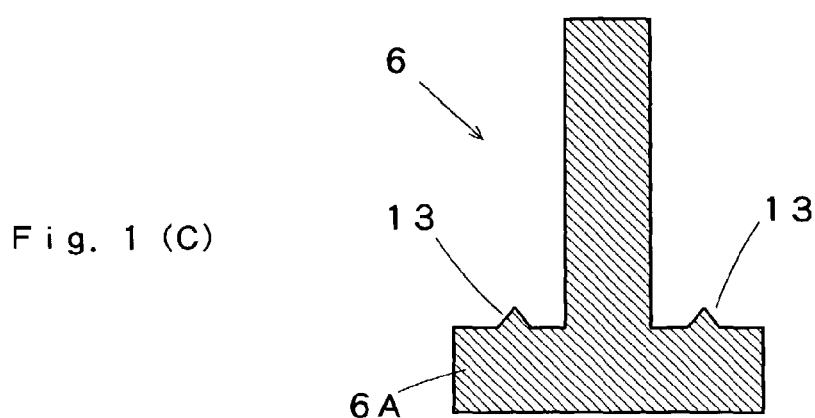

The present invention provides a closed type battery having an electrode terminal comprising a metal plate for sealing up an opening in a battery can, an insulating member that cover a through-hole provided through the metal plate and both surfaces of the metal plate around the through-hole, an electrode-drawing sheet positioned on a surface of the insulating member located on an outer surface of a battery and an electrode-leading pin that is inserted into the through-hole in the electrode-drawing sheet and caulked from above and below, wherein:

at the surface of contact of the flange of the electrode-leading pin with said insulating member there is provided at least a projection.

In one specific embodiment of the invention, the flange of the electrode-leading pin is provided with a projection and a recess.

In another specific embodiment of the invention, the projection has an acute tip, and the deepest portion of the recess has an acute form.

In yet another specific embodiment of the invention, the recess is located at a position nearer to the center of the shaft of the electrode-leading pin than the projection.

In a further specific embodiment of the invention, both the projection and recess are configured in a ring form.

In a further specific embodiment of the invention, the closed type battery is a lithium ion battery.

DESCRIPTION OF THE PREFERRED EMBODIMENTS

The present invention provides a closed type battery comprising a monolithic electrode-drawing sheet obtained by caulking of an electrode-leading pin. By providing the electrode-leading pin with a projection at a flange in contact with an insulating member, the electrode-leading pin can be caulked without any displacement of the insulating member, whereby it is possible to provide a solution to problems such as a drop of airtightness by reason of a void that may be formed at the junction of an internal insulating sheet and an external insulating sheet. This finding underlies the present invention.

FIGS. 1(A), 1(B) and 1(C) are illustrative of the closed type battery according to the present invention. FIG. 1(B) is illustrative in perspective of parts or members prior to the assembling of a header 7, and FIG. 1(C) is illustrative of one example of an electrode-leading pin.

A metal plate 3 of the header 7 that forms a part of the closed type battery is provided with an external insulting sheet 4A and an internal insulating sheet 4B that cover the inside surface of a through-hole 10 formed through the metal plate 3 and the upper and lower surface portions of the metal plate 3 around the through-hole, and on top of the external insulating sheet 4A there is provided an electrode-drawing sheet 5.

The external insulating sheet 4A has a cylindrical shaft 4AT that comes into contact with the internal insulating sheet 4B in a flat sheet form.

A flange 6A of the electrode-leading pin 6 is provided with a projection 13, so that upon the electrode-leading pin 6 caulked, the projection 13 is engaged into the internal insulating sheet 4B, making it possible to prevent any displacement of the internal insulating sheet 4B.

Consequently, it is possible to prevent any void from being created at the junction of the internal insulating sheet 4B and the external insulating sheet 4A.

As shown in FIG. 1(C) that illustrates in section the electrode-leading pin 6, the projection 13 is formed on the flange 6A of the electrode-leading pin 6. Preferably in this case, the projection 13 should have an acute tip so that it can be engaged in the surface of contact with the internal insulating sheet. While it is acceptable to form such a projection on a part of the flange, it is preferable to use a ring form of projection because uniform pressure is applied to the internal insulating sheet. The projection used should also preferably have a height of 0.05 mm to 0.20 mm.

Figure 2:
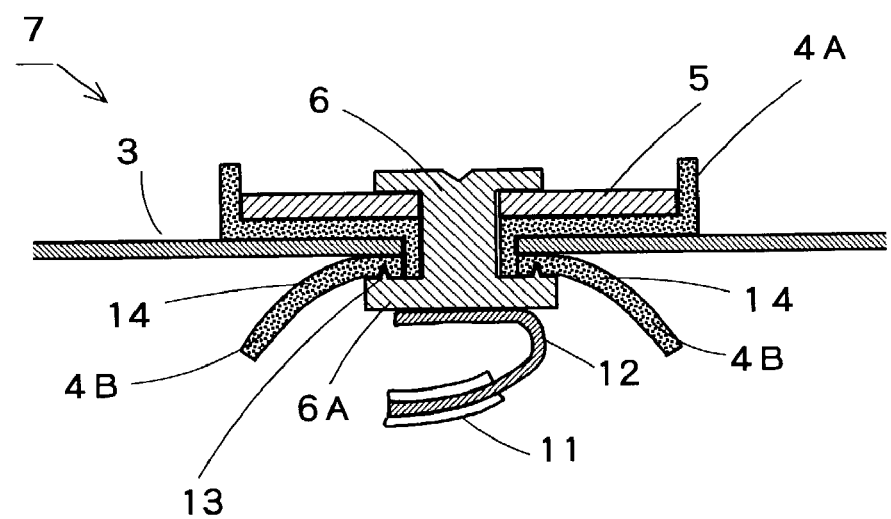
FIG. 2 is illustrative of another embodiment of the closed type battery according to the present invention.

FIG. 2 is illustrative in section of another embodiment of the closed type battery according to the present invention, showing in detail the electrode-leading terminal portion of the closed type battery.

Figure 3:
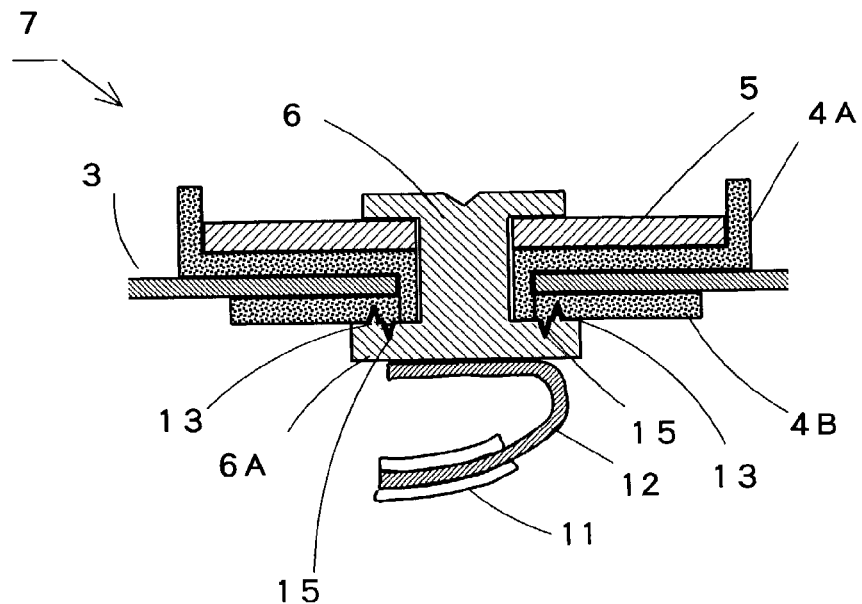
FIGS. 3(A) and 3(B) are illustrative of yet another embodiment of the closed type battery according to the present invention.
Figure 3:
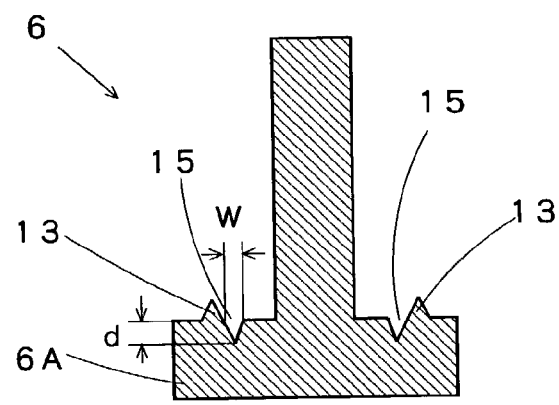
Figure 4:
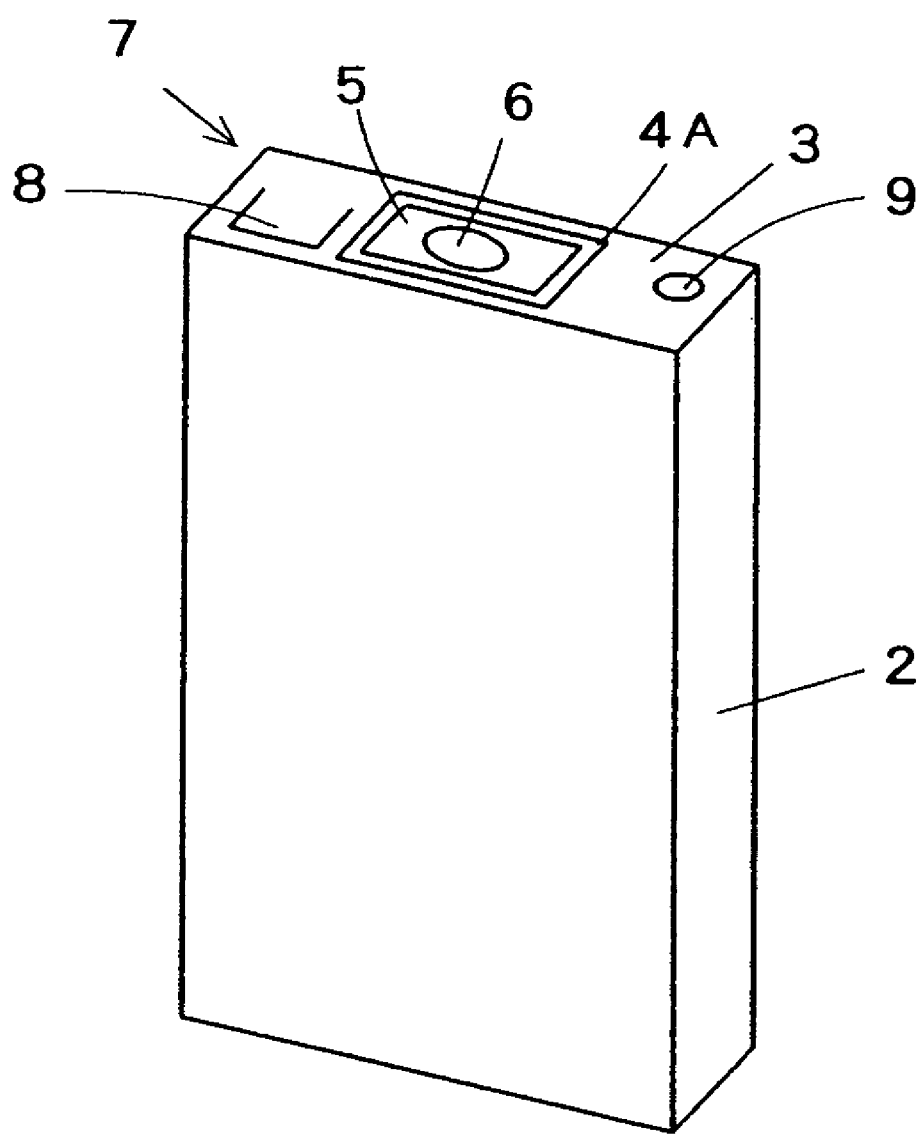
FIG. 4 is illustrative of one example of a conventional closed type battery.
Figure 6:
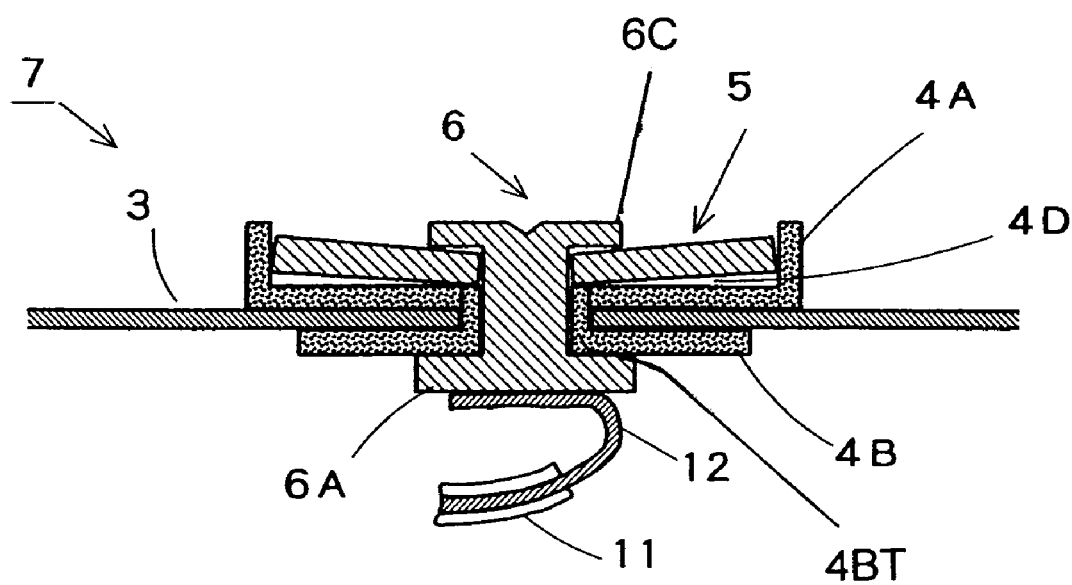
FIG. 6 is illustrative of another example of the header in the closed type battery.

In the closed type battery shown in FIG. 1, although depending on the position and size of the projection 13 formed on the flange 6A of the electrode-leading pin 6 and the material and physical properties such as thickness of the internal insulating sheet 4B, the projection 13 applies strong force to the end of the internal insulating sheet. This may cause the internal insulating sheet 4B to suffer warping as shown at 14, resulting in poor engagement of the flange surface with the internal insulating sheet. Such a problem can be solved by use of an electrode-drawing terminal as shown in FIG. 3.

FIGS. 3(A) and 3(B) are illustrative in section of another embodiment of the electrode-drawing terminal of the closed type battery. FIG. 3(A) is a sectional view of the electrode-drawing terminal and FIG. 3(B) is a sectional view of the electrode-leading pin.

The electrode-drawing terminal of FIG. 3(A) is characterized in that an electrode-leading pin 6 has a flange 6A provided with a projection 13 and a recess 15.

By the provision of both the projection 13 and the recess 15, local deformation, if any, of the internal insulating sheet by pressure upon caulking of the electrode-leading pin 6 is absorbed by the recess 15 positioned adjacent to the projection 13, so that the internal insulating sheet is unlikely to suffer large deformation, ensuring that the surface of contact can be stabilized.

The width, W, of the recess 15 should preferably be in the range of 0.05 mm to 0.20 mm and the depth, d, of the recess 15 should preferably be in the range of 0.02 mm to 0.10 mm.

The projection-and-recess combination has an additional effect on making the length of contact of the electrode-leading pin with the internal insulating sheet so long that much more improved sealability is obtained.

Like the projection, the recess should preferably be configured in the form of a ring that ensures uniform distribution of pressure.

Besides, the recess should preferably be located nearer to the center of the electrode-leading pin than the projection, and have an acute form that is effective for limiting displacement of the internal insulating sheet.

The internal and external insulating sheets may be each formed of polypropylene, or thermoplastic fluorocarbon resin such as tetrafluoroethylene-perfluoroalkoxyethylene copolymer (PFA), and tetrafluoroethylene-hexafluoropropylene (FEP), etc.

For the electrode-drawing sheet provided on the upper surface of the external insulating sheet positioned on the outer surface of the header, for instance, use may be of a nickel sheet, a nickeled soft steel sheet, a copper sheet, and a nickel silver sheet.

For the electrode-leading pin, it is preferable to use a pin that is obtained by configuring a metal material such as aluminum or its alloy to an electrode-leading pin blank and then annealing that blank.

Annealing allows the electrode-leading pin to be uniformly transformed upon caulking, and to have so decreased surface hardness that surface cracking or other defects are unlikely to occur. This in turn makes improvements in airtightness between the electrode-leading pin and the insulating member, and so on.

It is here noted that annealing causes a temporary lowering of the hardness of the electrode-leading pin; however, the electrode-leading pin that has been caulked has a hardness equivalent to that of one not annealed because of being subjected to work-hardening by impacts on caulking. Thus, the sealing properties are unlikely to become low, nor is the caulking strength of the electrode-leading pin likely to drop.

The present invention is now explained more specifically with reference to working examples as well as a comparative example.

EXAMPLE 1

External and internal insulating sheets were mounted to a nickeled soft steel plate of oblong shape having a long side of 28.9 mm and a short side of 5.4 mm and provided with a central through-hole of 2.6 mm in diameter. On the external insulating sheet there was placed an electrode-drawing sheet of a nickel sheet having a central hole of 2.0 mm in diameter to make a header assembly. A cylindrical form of aluminum electrode-leading pin of 1.8 mm in diameter, with a 3.6 mm-diameter flange provided at a position 1.4 mm away from its center with a projection of 0.1 mm in height and 0.2 mm in width, was inserted through the header assembly from the internal insulating sheet side, and the electrode-leading pin was caulked from above and below to make a header.

The header was welded to a battery can formed of nickeled soft steel and having a height of 47.6 mm, a width of 30.0 mm and a thickness of 5.8 mm, in which a lithium ion battery element was already received. Then, an electrolyte was poured in the battery can through an electrolyte-pouring hole, after which the electrolyte-pouring hole was closed up to make a closed type battery.

The thus constructed 2,000 batteries were measured for whether or not there were electrolyte leakages from their electrode-drawing terminals after the lapse of 8 hours. It was consequently found that none of the batteries showed electrolyte leakages.

EXAMPLE 2

A header was made by caulking an electrode-leading pin from above and below as in Example 1 with the exception that the flange of the electrode-leading pin was provided at a position 1.2 mm away from its center with a tapered, ring recess of 0.5 mm in depth and 0.1 mm in width as measured on the flange surface and at a position outside and adjacent to the recess with a projection of 0.1 mm in height and 0.2 mm in width, thereby obtaining a closed type battery.

The thus assembled 2,000 batteries were measured for whether or not there were electrolyte leakages from their electrode-drawing terminals after the lapse of 8 hours. It was consequently found that none of the batteries showed electrolyte leakages.

COMPARATIVE EXAMPLE 1

With the exception that no projection was formed on the electrode-leading pin, a battery header was prepared as in Example 1, thereby obtaining a closed type battery. The thus assembled 2,000 batteries were measured for whether or not there were electrolyte leakages from their electrode-drawing terminals after the lapse of 8 hours. As a result, it was found that 30 batteries showed electrolyte leakages.

In the closed type battery of the present invention, the external connection terminal is prepared by caulking of the electrode-leading pin via the internal and external insulating sheets. This external connection terminal has a projection at the flange surface where the electrode-leading pin comes in contact with the internal insulating sheet. Upon caulking, the internal insulating sheet is unlikely to displace. It is thus possible to provide a closed type battery having improved airtightness.

What we claim is:

1. A closed type battery having an electrode terminal comprising a metal plate for sealing up an opening in a battery can, an insulating member that cover a through-hole provided through the metal plate and both surfaces of the metal plate around the through-hole, an electrode-drawing sheet positioned on a surface of the insulating member located on an outer surface of the battery and an electrode-leading pin that is inserted into the through-hole in the electrode-drawing sheet and caulked from above and below, wherein:
    at a surface of contact of a flange of the electrode-leading pin with said insulating member there is provided at least a projection and a recess, said projection having an acute tip and said recess being acute at a deepest portion.

2. The closed type battery according to claim 1, wherein said recess is located at a position nearer to a center of a shaft of said electrode-leading pin.

3. The closed type battery according to claim 1, wherein said projection is configured in a ring form.

4. The closed type battery according to claim 1, wherein said projection and recess are each configured in a ring form.

5. The closed type battery according to claim 1, wherein said projection and recess are each configured in a ring form, and said recess is located at a position nearer to a center of a shaft of said electrode-leading pin.

6. The closed type battery according to claim 1, which is a lithium ion battery.

\* \* \* \* \*